United States Patent
Knittel et al.

(10) Patent No.: US 10,260,390 B2
(45) Date of Patent: Apr. 16, 2019

(54) COOLING DEVICE WITH DRAINAGE OPENINGS FOR A METERING VALVE

(71) Applicant: Robert Bosch GmbH, Stuttgart (DE)

(72) Inventors: Achim Knittel, Ditzingen (DE); Stephan Pohl, Schwieberdingen (DE); Martin Kiontke, Ditzingen (DE)

(73) Assignee: Robert Bosch GmbH, Stuttgart (DE)

( * ) Notice: Subject to any disclaimer, the term of this patent is extended or adjusted under 35 U.S.C. 154(b) by 36 days.

(21) Appl. No.: 14/360,716

(22) PCT Filed: Nov. 21, 2012

(86) PCT No.: PCT/EP2012/073166
§ 371 (c)(1),
(2) Date: May 27, 2014

(87) PCT Pub. No.: WO2013/076112
PCT Pub. Date: May 30, 2013

(65) Prior Publication Data
US 2014/0332180 A1 Nov. 13, 2014

(30) Foreign Application Priority Data
Nov. 25, 2011 (DE) .................. 10 2011 087 085

(51) Int. Cl.
*F01N 3/20* (2006.01)
*F02M 53/04* (2006.01)

(52) U.S. Cl.
CPC ...... *F01N 3/2066* (2013.01); *F01N 2260/024* (2013.01); *F01N 2610/02* (2013.01);
(Continued)

(58) Field of Classification Search
CPC ........... F02M 53/043; F02M 2700/077; F02M 53/04; F01N 2260/024; F01N 2610/1453; Y10T 137/6579; Y02T 10/24
(Continued)

(56) References Cited

U.S. PATENT DOCUMENTS 3,077,073 A * 2/1963 Kuhrt ................... F02K 9/48
60/259
5,605,042 A 2/1997 Stutzenberger
(Continued)

FOREIGN PATENT DOCUMENTS

| CN | 103958846 A | 7/2014 | |
|---|---|---|---|
| DE | 102009047375 | 6/2011 | |
| GB | 363560 A * | 12/1931 | ............... F01P 3/16 |
| JP | 9096212 | 4/1997 | |
| JP | 2007321647 | 12/2007 | |
| JP | 2010031769 | 2/2010 | |

OTHER PUBLICATIONS

International Search Report for Application No. PCT/EP2012/073166 dated Jan. 30, 2013 (English Translation, 2 pages).

*Primary Examiner* — Audrey K Bradley
*Assistant Examiner* — Anthony Ayala Delgado
(74) *Attorney, Agent, or Firm* — Michael Best & Friedrich LLP (57) ABSTRACT

The invention relates to a device for cooling a metering module, in particular a module for metering an operating agent/auxiliary agent such as a reducing agent into the exhaust gas system of an internal combustion engine. A cooling device through which a cooling fluid flows is associated with the metering module (10). An outer surface (34) of the metering module (10) is enclosed by a cooling member (18, 20, 22) through which the cooling fluid flows. The multi-part cooling member (18, 20, 22) comprises drainage openings (30) for discharging (78) the cooling
(Continued)

fluid/for discharging liquids in order to prevent said fluid/liquids from accumulating on the bottom of the cooling member (18, 20, 22).

22 Claims, 5 Drawing Sheets

(52) U.S. Cl.
CPC ... *F01N 2610/11* (2013.01); *F01N 2610/1453* (2013.01); *F02M 53/043* (2013.01); *Y02A 50/2325* (2018.01); *Y02T 10/24* (2013.01)

(58) Field of Classification Search
USPC .................................................. 60/286, 324
See application file for complete search history.

(56) References Cited

U.S. PATENT DOCUMENTS

| | | | |
|---|---|---|---|
| 5,638,775 A * | 6/1997 | Hollis | F01P 3/20 123/41.08 |
| 5,647,316 A | 7/1997 | Hellen et al. | |
| 6,192,677 B1 * | 2/2001 | Tost | B01D 53/9431 60/286 |
| 8,074,903 B2 * | 12/2011 | Venkataraghavan | F02M 47/027 239/132 |
| 2010/0313553 A1 | 12/2010 | Cavanagh et al. | |

* cited by examiner

COOLING DEVICE WITH DRAINAGE OPENINGS FOR A METERING VALVE

BACKGROUND OF THE INVENTION

DE 44 36 397 A1 relates to a device for the aftertreatment of exhaust gases. According to this solution, a reducing agent is introduced into the exhaust gas which is fed to the catalyst. The introduction is carried out in this case via an electrically controlled metering valve which is combined with a control valve in a common housing. The control valve serves for the controlled introduction of supplied pressurized air, in which a quantity of reducing agent, which is received via the metering valve, is processed and intermittently introduced into the exhaust gas. As a result, urea deposits and agglutinations on the metering valve and control valve can be avoided and an optimum processing of the introduced reducing agent can be achieved.

US 2010 0313553 relates to an injector for exhaust gas aftertreatment, which introduces an urea solution for lowering NOx emissions in an exhaust gas system. In this case, the injection end of the injector is enclosed by an inner housing and an outer housing. A gap which results between the inner housing and the outer housing serves as a temperature barrier. The outer housing is of nozzle-like design and allows the mounting of the injector inside an exhaust gas pipe by means of a flange.

U.S. Pat. No. 5,647,316 relates to an injector device for an internal combustion engine for introducing a pressurized fluid into a cylinder space. The injector in this case comprises a first valve and a second valve. Whereas the first valve serves for injecting fuel, the second valve serves for introducing an auxiliary substance, for example water or a urea solution. The second valve is operated by means of a valve element. This valve element is hydraulically actuated via a hydraulic line. A drainage line, by means of which surplus hydraulic fluid can be drained off and fed to a tank, is located on the valve element.

DE 10 2009 047 375 A1 relates to a metering module with fluid cooling. Disclosed there is a device for cooling a metering module, especially for the metered feed of a reducing agent into the exhaust gas tract of an internal combustion engine. A cooling device, through which flows a cooling fluid, is associated with the metering module. A generated surface of the metering module is enclosed by a cooling body through which flows a cooling fluid.

A disadvantage of known active cooling solutions is the absence of cooling effect in the upper region, especially in the electrical contact region of an injection valve of the metering module. As a result, there is no possibility of using the metering module at an ambient temperature level above 160° C. The electrical plug-in connector and the coil of the injection valve can suffer damage at a temperature level which lies above 160° C.

SUMMARY OF THE INVENTION

According to the invention, it is proposed to enclose a metering module, especially for introducing an operating/auxiliary substance, such as a reducing agent, into the exhaust gas tract of an internal combustion engine, by means of a housing which enables cooling of the entire metering module. As a result of the arrangement of at least one drainage opening, it is ensured that the forming of a sump as a result of fluid residue being deposited in a part of the cooling body of one-piece or multi-piece design, which encloses the metering module as a complete housing, is minimized and ideally totally excluded.

Drainage openings can advantageously be formed, for example with a 90° spacing or with a 120° spacing, on a part, for example on an annularly formed collar of a cup-shaped insert. Particularly when the channel-like recesses in the annular surface of the cup-shaped insert of the cooling body of multi-piece design extend in the radial direction, it is ensured that transporting away of the fluid can be facilitated as a result of the radial inclination of the channel-like recesses from the inside outward.

As a result of the solution proposed according to the invention concerning the provision of drainage openings, whether they be with a 90° spacing or with a 120° spacing, in the case of a cooling body of one-piece or multi-piece design the forming of a sump in this can be avoided. The forming of a sump on the one hand can lead to corrosion phenomena, and on the other hand, in addition to corrosion phenomena on the cooling body, electrical short circuits can also occur on the electrically operated components of the metering module, especially in the region of the plug-in contact, so that the operability of the metering module cannot be ensured in all the operating phases, especially during fording or the like.

As a result of the solution proposed according to the invention, a transporting away of fluid, whether it be infiltrated water or condensation water, from the interior of the cooling body of one-piece or multi-piece design is ensured.

BRIEF DESCRIPTION OF THE DRAWINGS

With reference to the drawing, the invention is described in more detail below.

In the drawing.

DETAILED DESCRIPTION

Figure 1:
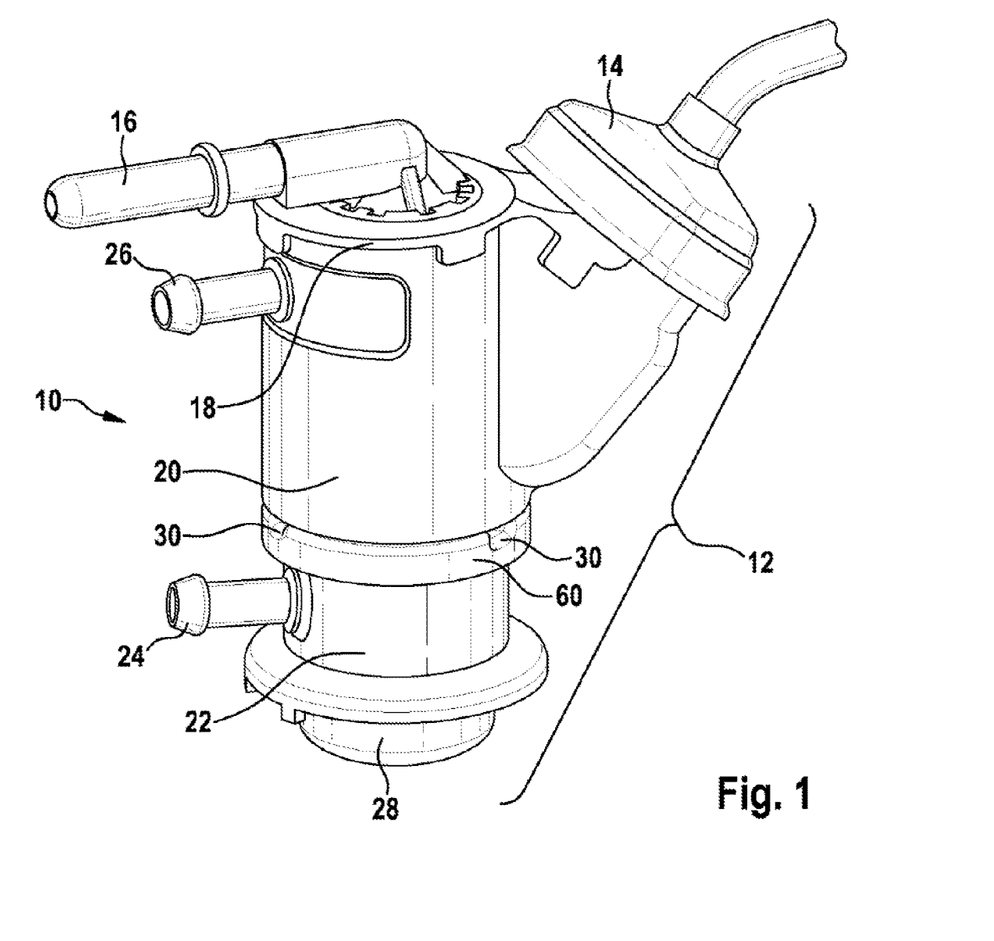
FIG. 1 shows a perspective plan view of a metering module which is enclosed by a complete housing in the form of a cooling body of multi-piece design.

FIG. 1 shows a perspective view of a metering module which is enclosed by a housing, wherein the housing is formed from a plurality of components.

FIG. 1 shows that a metering module 10 comprises a housing 12. An electrical contact—not shown in FIG. 1—which lies inside the metering module 10, is enclosed by a plug cover 14 and towards the outside is sealed against spray water. Furthermore, the housing 12 comprises an upper shell 18 in which is located a reducing agent inlet 16 of angled design. Located beneath the upper shell 18 is a center shell 20, below which is arranged in turn a rotatable flange 22 of the housing 12 of the metering module 10.

As also apparent from the view according to FIG. 1, an inner part 28 is let into the rotatable flange 22. A cooling fluid inlet 24 and a cooling fluid outlet 26 are located at the side on the generated surface of the center shell 20 and of the rotatable flange 22 respectively. Via the cooling fluid inlet 24, cooling fluid, which for example circulates in an internal combustion engine, enters the rotatable flange 22 of the housing 12, and discharges again through the cooling fluid outlet 26 which is located at the side on the generated surface of the center shell 20. The cooling fluid transports heat from the metering module 12 and ensures that depending upon the temperature level cooling of the metering module 10 and therefore maintaining of the operability of said metering module at a temperature level of approximately 120° C. or even above can be ensured.

Figure 3:
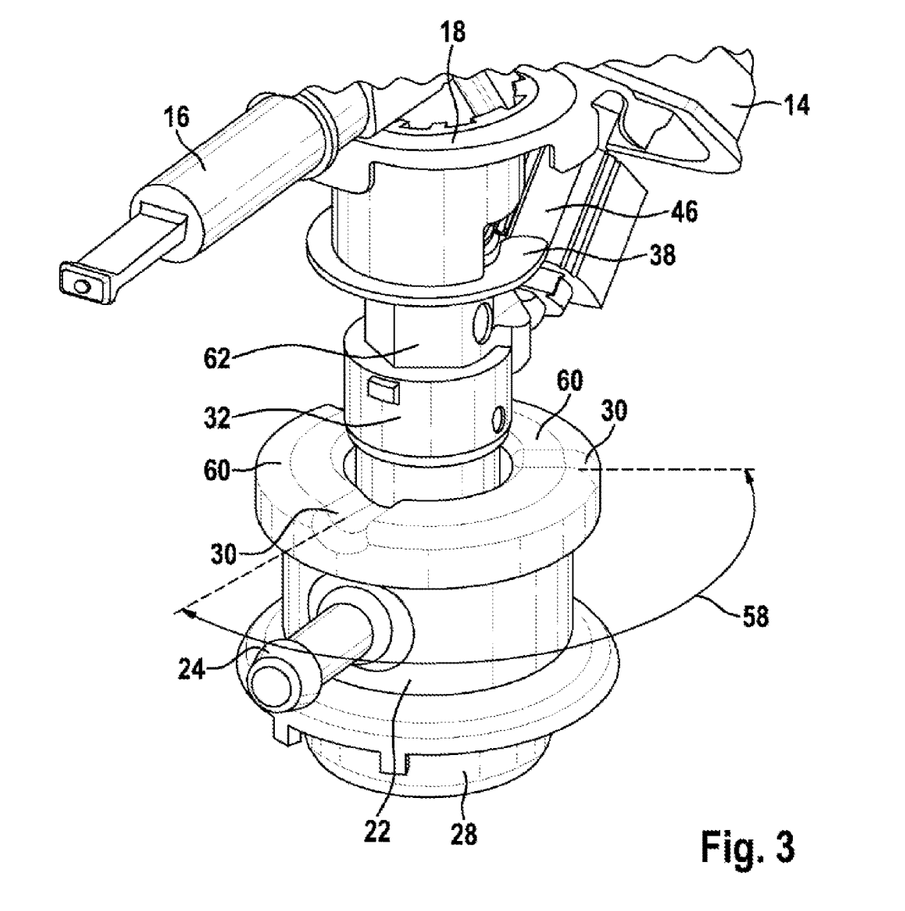
FIG. 3 shows a perspective plan view of the metering module with the center shell removed.

From the view according to FIG. 1 it can be gathered that drainage openings 30 in the form of channel-like recesses can be formed along an annularly formed collar 60 of the rotatable flange 22—compare more detailed views according to FIG. 3.

Figure 2:
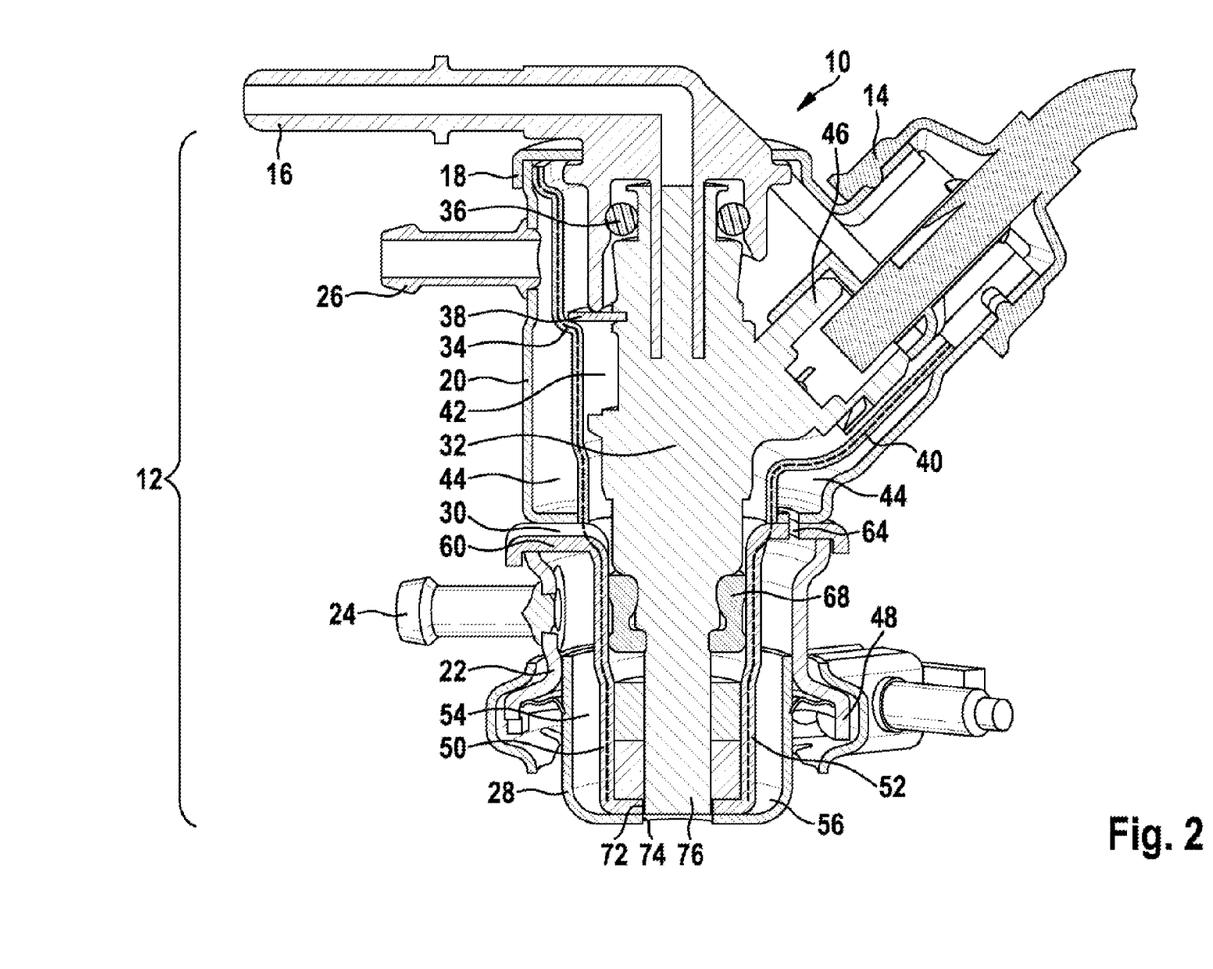
FIG. 2 shows a section through the metering module represented in FIG. 1.

FIG. 2 shows a sectional view through the metering module according to the view in FIG. 1, the housing of which is of multi-piece design.

From the sectional view according to FIG. 2 it is apparent that the housing 12 encloses the upper shell 18 along with the reducing agent inlet 16 of angled design. The upper shell 18 is located above the center shell 20 and covers this like a cap, for example. The center shell 20 in its turn encloses a generated surface 34, i.e. a surface of the metering module 10 which is to be cooled. Located beneath the center shell 20 is the rotatable flange 22 which in its turn accommodates an inner part 28 which encloses the end of a metering valve 32 via which the operating/auxiliary substance, especially the reducing agent, is introduced into the exhaust gas tract of the internal combustion engine during operation of the metering module 10.

From the sectional view according to FIG. 2 it can be gathered that the reducing agent inlet 16 extends through the center shell 18 and merges into the metering valve 32 on the upper end face. The upper shell 18 is sealed against the metering valve 32 by means of a sealing ring 36. The operating/auxiliary substance, especially the reducing agent, flows through the interior of the metering valve 32—not shown here in more detail—to the "hot" part of the metering valve 32 in which is accommodated an injection valve via which the operating/auxiliary substance is injected into the exhaust tract—not shown here in more detail—of an internal combustion engine.

If like in the views according to FIGS. 1 and 2 the reducing agent inlet 16 is of an angled design and is oriented in one plane with regard to the cooling fluid inlet 24 and also of the cooling fluid outlet 26, the possibility exists, depending upon installation conditions, of arranging the reducing agent inlet 16 in a horizontal plane in any positions spanning 360° on the upper shell 18. This is dependent upon the available installation space, the length of the connecting hoses or connecting lines—and also upon further installation parameters.

The metering valve 32 is enclosed by a cooled surface 34 according to the sectional view in FIG. 2. The center shell 20 which is arranged beneath the upper shell 18 on the one hand includes a cavity 42 which receives a cooling fluid and on the other hand includes a cavity 44 which does not come into contact with cooling fluid, i.e. in the present context can be referred to as being dry.

Located in the cavity 44 is an electrical plug-in contact 46 which by means of the plug-in connector cover 14, which is already explained in conjunction with FIG. 1, is protected against spray water and dirt.

FIG. 2 shows that a separating ring 38 extends on the inside with regard to the cooled surface 34 of the metering module 10. On the outside, the cooled surface 34 of the metering module 10 with the inner side of the center shell 20 delimits a cavity 42 which receives the cooling fluid. This cavity extends in the circumferential direction around the metering valve 32. Part of this cavity 42 is also a cavity part which is separated by a dividing wall 40 from the radially inner cavity 44 which is not in contact with cooling fluid.

The rotatable flange 22 comprises the already mentioned cooling fluid inlet 24 which extends in the radial direction at the side, starting from the generated surface of the rotatable flange 22. Via the cooling fluid inlet 24, cooling fluid flows to the inner part 28 and finds its way into its cavity 56. From there, the inflowing cooling fluid, via a transfer opening 64, passes into the cavity 42 of the center shell 20. As soon as the cooling fluid passes via the at least one transfer opening 64 from the cavity 56 of the inner part 28 into the cavity 44 which is formed by the center shell 20, this region of the metering valve 32 is cooled as a result of the wetting by the cooling fluid of the cooled surface 34 or of the dividing wall 40. From the cavity 44, which lies inside the center shell 20, the cooling fluid, then having a higher temperature on account of its heating, flows via the at least one cooling fluid outlet 26 back again into the cooling fluid circuit of an internal combustion engine or into a separate cooling fluid circuit, for example.

From the sectional view according to FIG. 2 it is apparent that the forming of a sump in the lower region of an inner space 42 between the cooling surfaces 34 or of the dividing wall 40 is avoided by the fact that at the lower end of the inner space this leads into at least one drainage opening 30 which is impressed, or produced in another way, as a channel-like recess in an annularly formed collar 60. Ideally, this at least one channel-like recess, which functions as a drainage opening 30, has an inclination from the inside outward in the radial direction so that fluid can flow out of the inner space 42.

In the right-hand part of FIG. 2, a further drainage opening 30, formed as a channel-like recess in the annularly formed collar 60 of the cup-shaped insert 50, is not shown since it does not lie in the section plane according to FIG. 2.

Also apparent from the view according to FIG. 2 is that the lower tapering region of the metering valve 32, which is in the direction of a valve tip 76, is supported or centered in the cup-shaped insert 50 by means of a support ring 68. The valve tip 76, which is subjected to the highest thermal stress, extends through a first opening 72, which is formed in the cup-shaped insert 50, into a further, second opening 74 which is located on the bottom surface of the inner part 28. The exhaust gas flow—not shown in FIG. 2—in the exhaust gas tract of an internal combustion engine passes across the furthest outer-lying second opening 74 with regard to the metering module 10 so that the valve tip 76 is not directly subjected to the temperatures of the exhaust gas flow. The temperature of the exhaust gas flow lies typically within a temperature range in the order of magnitude of between 200° C. and 750° C., depending upon the operating temperature of the internal combustion engine.

From the view according to FIG. 2 it can be gathered that the cup-shaped insert 50 comprises an annularly formed collar 60 into which are let individual channel-like recesses which form the drainage openings 30. It can also be gathered from FIG. 2 that between the cup-shaped insert 50—on the inside—and the inner wall of the inner part 28 a baffle plate can be arranged.

On the left-hand side in FIG. 2, above the cooling fluid inlet 24, a radially extending channel-like recess, which forms a drainage opening 30 and is arranged in the annularly formed collar 60, is identified by item 30.

Finally, it can be gathered from FIG. 2 that the rotatable flange 22 of the housing 12 which encloses the upper shell 18 and the center shell 20 has a clamping ring 48 with which the cooling body 18, 20, 22 of multi-piece design, which constitutes the housing 12, is fastened on the exhaust gas tract—not shown here—of an internal combustion engine.

On account of the fact that the cooling fluid first of all enters the rotatable flange 22 via the cooling fluid inlet 24, a significant cooling effect can be achieved at the end of the metering valve 32 of the metering module 10 at which the highest operating temperatures occur during operation of said metering module 10—this means in the region of the valve tip 76 of the metering valve 32—without, however, neglecting cooling of the metering module 10 in the upper region, i.e. in the region of the electrical plug-in contact 46. By means of the solution proposed according to the invention cooling of all the temperature-sensitive regions of the metering module 10 is possible.

FIG. 3 shows a perspective plan view of an annularly formed collar which is constructed on the cup-shaped insert of the cooling body of multi-piece design.

For reasons of improved presentability, in the perspective view according to FIG. 3 the center shell 20 of the housing 12 and also the cooled surface 34 of the metering module 10 are not shown. For this reason, a hexagon 62, which is formed on the metering valve 32, can be seen in FIG. 3. The metering valve 32, as shown in FIG. 3, is encompassed by an annularly formed collar 60 in which are formed individual channel-like recesses—with a 120° spacing (compare item 58), for example—which constitute drainage openings 30. In the embodiment variant of the drainage openings 30 according to FIG. 3, these are formed in the annularly formed collar 60 with a 120° spacing 58, but could also be constructed with a 90° spacing (compare item 66 according to the FIG. 5) or with another spacing. The channel-like recesses, which constitute the drainage openings 30, can also extend in the surface 60 of collar-like design of the cup-shaped insert 50 with an inclination from the inside outward in the radial direction, as is shown in the example of FIG. 4.

Reverting to FIG. 2, which shows a sectional view of the metering module 10, channel-like recesses 64, which are arranged beneath the center shell 20—with a 120° spacing 58 for example—extend in the surface 60 of collar-like design so that fluid can flow out from the center shell 20 from the inside outward in the radial direction, avoiding the forming of a sump. Therefore, it is ensured that fluid that may be present can flow out of the inner space 42—formed by the separating ring 38, the inner side of the cooled surface 34 and the outer side of the metering valve 32—on account of gravitational effect in the downward direction into the drainage openings 30—in the form of impressed channel-like recesses, for example—which are formed in the annularly formed collar 60 so that the occurrence of corrosion is effectively counteracted.

From the perspective plan view according to FIG. 3 it can be gathered that the surface 60 of collar-like design is located at the upper end of the cup-shaped insert 50 and in this embodiment variant encompasses the generated surface of the rotatable flange 22 in a flush manner. The cooling fluid inlet 24 is located in the generated surface of the rotatable flange 22. Furthermore, parts of the upper shell 18 and of the reducing agent inlet 16 are to be seen, as well as the electrical plug-in contact 36 on the side of the upper shell 18 which lies opposite the cooling fluid outlet 26. Also to be gathered from FIG. 3 is the separating ring 38, only partially shown in FIG. 2, which at the top delimits the inner space 42 between the metering valve 32 and the inner side of the cooled surface 34.

Figure 4:
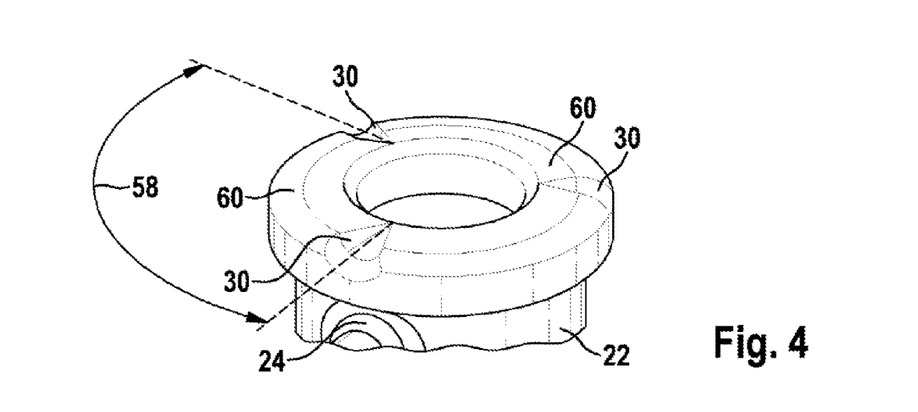
FIG. 4 shows a view of channel-like recesses which on an annularly formed collar extend with an inclination from the inside outward in the radial direction.

To be gathered from FIG. 4 is an embodiment possibility of drainage openings which are formed as channel-like recesses.

From the view according to FIG. 4 it is apparent that drainage openings 30, which are arranged with a 120° spacing 58, extend in the upper planar surface of the annularly formed collar 60 of the cup-shaped insert 50. These drainage openings are manufactured by impression or by a metal-cutting means, for example, into the planar surface of the annularly formed collar 60. As can be gathered from the perspective view according to FIG. 4, in this advantageous embodiment variant the drainage openings 30, formed as channel-like recesses, have an inclination from the inside outward. On account of the inclination which the drainage openings 30 have from the inside outward in the radial direction, it is ensured that fluid discharging from the inner space 42 drains off to the outside on account of gravitational force and the forming of a sump inside the metering module 10 is excluded. It is apparent from the view according to FIG. 4 that with reference to FIGS. 1 and 2 the rotatable flange 22 is arranged beneath the annularly formed collar 60, from which flange the cooling fluid inlet 24, which is partially shown in FIG. 4, extends radially at the side.

It is apparent from FIG. 4 that the geometry of the drainage openings 30, formed as channel-like recesses, has a funnel-shaped appearance and continuously widens from the inside outward, as seen in the radial direction. The inclination angle at which the drainage openings 30, formed as channel-like recesses, extend in the annularly formed collar 60 can be optimized with regard to production engineering. It is possible to impress, for example, the drainage openings 30, formed as channel-like recesses, into the annularly formed collar 60 by means of a forming technique, or also to produce the drainage openings 30 by metal cutting. This depends upon the production engineering circumstances.

Figure 5:
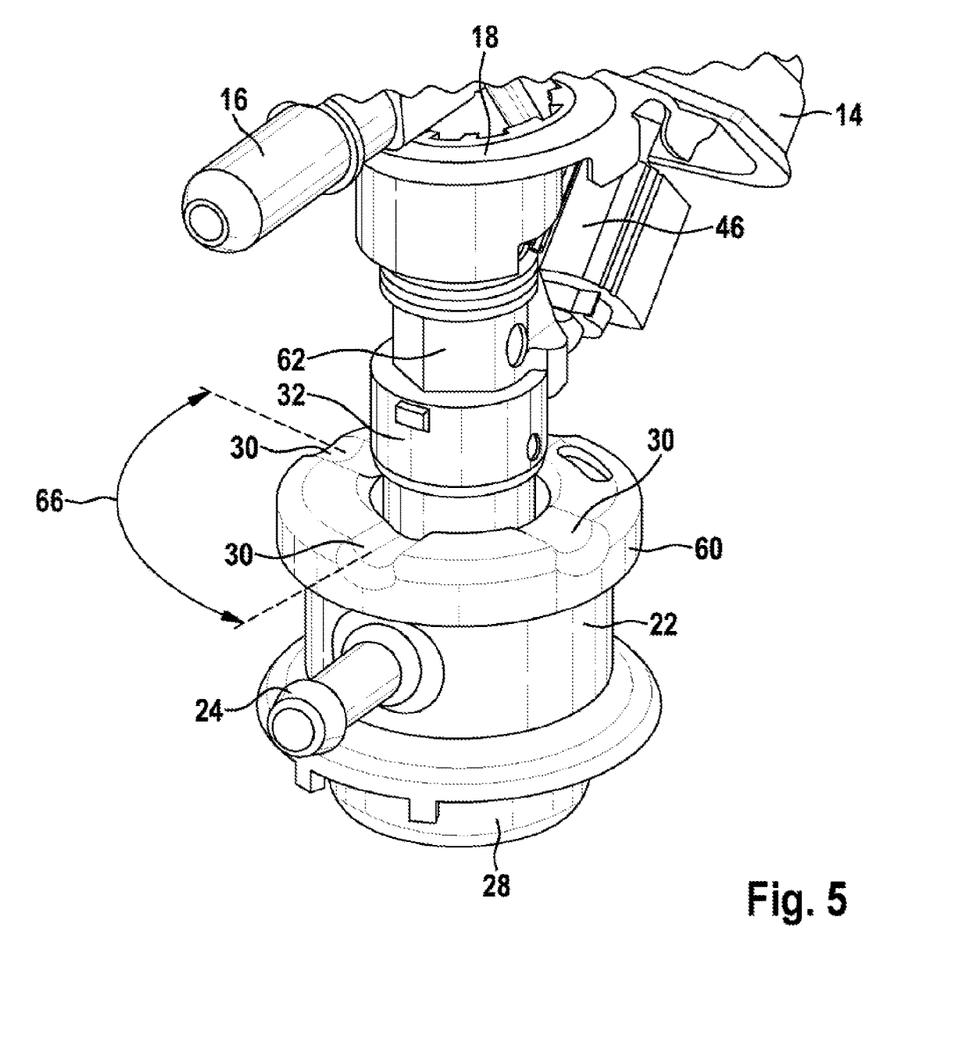
FIG. 5 shows a perspective view of the metering module with channel-like recesses which are arranged with a 90° spacing.

FIG. 5 shows a further embodiment variant of the metering module which is proposed according to the invention.

For reasons of improved representability, in the view according to FIG. 5, corresponding to the view according to FIG. 3, the center shell 20 is removed so that a better view of the planar surface of the annularly formed collar 60 can be achieved.

It is apparent from FIG. 5 that in this embodiment variant four drainage openings 30 extend in the annularly formed collar 60 with a 90° spacing 66. The individual drainage openings 30 are also formed in this case as channel-like recesses which are impressed into the annularly formed collar 60. As a variation to the view of the drainage openings 30 arranged with a 90° spacing 66, these can also have an inclination which extends from the inside outward in the radial direction in order to facilitate the transporting away of a fluid. In FIG. 5, the 90° spacing 66, in which the individual drainage openings are oriented relatively to each other in the annularly formed collar 60, are identified by the designation 66. To be seen beneath the annularly formed collar 60 is the generated surface of the rotatable flange 22 on which at least one cooling fluid inlet 24 is formed in the radial direction. To be seen beneath the rotatable flange 22 is the inner part 28 which is located at the lower end of the metering module 10.

FIG. 5 also shows that in this embodiment variant the reducing agent inlet 16 and the at least one cooling fluid inlet 24 lie one above the other on the rotatable flange 22 in an imaginary plane which extends in the vertical direction. In this case, other geometries are naturally also possible, this depending upon the respective installation conditions of the metering module 10, whether it be mounted in the engine compartment of a vehicle or in the floor assembly of a vehicle in the proximity of the exhaust gas tract of an internal combustion engine.

Designation 62 identifies a hexagon, which is constructed on the metering valve 32, and item 46 identifies an electrical plug-in contact which projects from the metering valve 32 at the side. A plug-in connector cover 14 is located above the plug-in contact 46. The reducing agent inlet 16, which is formed at the side as an angled inlet, is molded on an upper shell 18, as a rule being a component which is produced as a plastic injected part.

Figure 6:
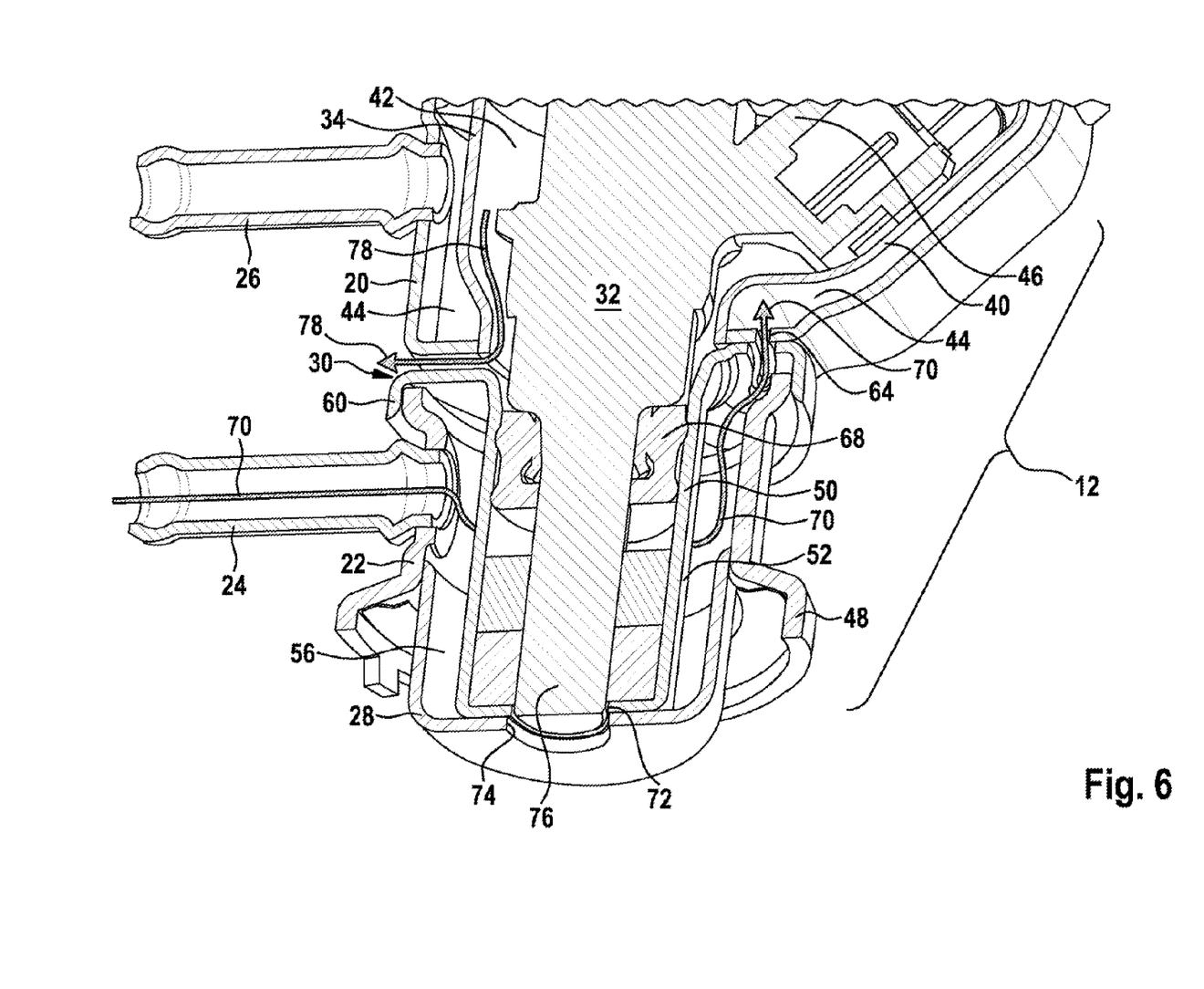
FIG. 6 shows a view of the cooling fluid flow through the lower region of the metering module.

To be gathered from FIG. 6 is the passage of the cooling fluid flow through the individual regions of a metering module which is enclosed by a housing. As FIG. 6 shows, the metering module, or the metering valve 32 which is arranged therein, is enclosed by a housing 12 so that all the temperature-sensitive regions of the metering module 10 can be effectively cooled.

From the view according to FIG. 6 it is apparent that a cooling fluid flow 70 flows through the at least one cooling fluid inlet 24, which is formed on the rotatable flange 22 at the side, into the cavity 56 of the inner part 28. The cavity 56 of the inner part 28 is delimited on one side by simply that inner part 28 and on the other side by the generated surface of the cup-shaped insert 50, at the upper end of which is located the annularly formed collar 60 which has already been mentioned on a number of occasions. The cooling fluid, as a cooling fluid flow 70, flows via the at least one cooling fluid inlet 24 into the cavity 56. As a result, the effect can be achieved of the valve tip 76 of the metering valve 32, which is subjected to high thermal loads, being able to be optimally cooled since the cooling fluid at the at least one cooling fluid inlet 24 enters the metering module 10 with the relatively coldest temperature. After the filling of the cavity 56, the cooling fluid transfers via the at least one transfer opening 64 into the upper part of the metering module 10. The cooling fluid flows into the cavity 44 so that the dividing wall 40 in the region of the electrical plug-in contact 46 is effectively cooled and on the other hand the cooled surface 34, which partially delimits the inner space 42, can also be cooled. From the cavity 44, the heated cooling fluid now flows via the at least one cooling fluid outlet 26 back into the cooling fluid circuit which can be either the cooling fluid circuit of the internal combustion engine or a separate cooling fluid circuit.

From the perspective sectional view according to FIG. 6 it can be gathered that fluids are transported away from the inner space 42 between the outer surface of the metering valve 32 and the inner side of the cooled surface 34 in the transporting direction 78 via the drainage openings 30, formed in the annularly formed collar 60, according to the marked arrow. On account of the gravitational effect, the fluids, or the fluid, are, or is, transported from the inner space 42 downward in the vertical direction and above the support ring 68 make their way radially outward to the side via the drainage openings 30 which in a corresponding number are formed in the planar surface of the annularly formed collar 60. Therefore, the forming of a sump inside the metering module 10 can be avoided, in particular the occurrence of corrosion can be effectively counteracted.

In the lower region of the metering module 10, it is to be seen that the valve tip 76, of tapered design, of the metering valve 32 projects through a first opening 72 which is formed in the cup-shaped insert 50. Furthermore, a second opening 74, along which passes the exhaust gas flow—not shown in FIG. 6—is formed in the inner part 28. Therefore, the valve tip 76 is not directly subjected to the exhaust gas flow which can feature temperatures in the region of between 200° C. and 750° C., depending upon the operating temperature of the internal combustion engine.

As FIG. 6 shows, the valve tip 76 is now arranged on the inside and does not project directly into the exhaust gas flow of the internal combustion engine.

What is claimed is:

1. A metering module (10), the metering module comprising:
   a metering valve (32);
   a surface (34) enclosing the metering valve (32) and partially defining an inner space therebetween; and
   a cooling body (18, 20, 22) enclosing the surface (34) and configured such that cooling fluid flows in a cavity between the cooling body and the surface, wherein the cooling body (18, 20, 22) is of a multi-piece design and at least one drainage opening is configured to drain away condensation from the inner space (42), which is not in fluid communication with the cavity.

2. The metering module as claimed in claim 1, characterized in that the at least one drainage opening includes a plurality of drainage openings arranged on a circumference of the metering module (10) with a 120° spacing (58).

3. The metering module as claimed in claim 1, characterized in that the at least one drainage opening is formed as a channel-like recess.

4. The metering module as claimed in claim 3, characterized in that the at least one drainage opening is impressed into the annularly formed collar.

5. The metering module as claimed in claim 1, characterized in that a cavity (56), which is delimited by an inner part (28) and a cup-shaped insert (50), is hydraulically connected to a cavity (44) of a center shell (20) via at least one transfer opening (64).

6. The metering module as claimed in claim 5, characterized in that the cooling fluid which enters the cavity (44) of the center shell (20) cools the surface (34) and a dividing wall (40) which is adjacent to an electrical plug-in contact (46).

7. The metering module as claimed in claim 1, characterized in that the at least one drainage opening includes a plurality of drainage openings arranged on a circumference of the metering module (10) with a 90° spacing (58).

8. The metering module of claim 1, wherein the cooling body comprises a first portion and a second portion rotatable relative to the first portion.

9. The metering module of claim 1, wherein the at least one drainage opening extends in an annularly formed collar.

10. The metering module as claimed in claim 9, characterized in that the annularly formed collar is located beneath a center shell (20) which is part of the cooling body.

11. The metering module as claimed in claim 9, characterized in that an annular recess, which constitutes the at least one drainage opening, is constructed in the annularly formed collar by metal cutting.

12. The metering module as claimed in claim 9, characterized in that the at least one drainage opening has an inclination from the inside outward in the radial direction.

13. The metering module as claimed in claim 9, characterized in that the inner space (42) opens out above the at least one drainage opening.

14. The metering module as claimed in claim 13, characterized in that the at least one drainage opening is configured to drain in a radially outward direction.

15. A method for cooling a metering module (10) for introducing a reducing agent into the exhaust gas tract of an internal combustion engine, comprising enclosing at least one surface (34) of the metering module (10) with a cooling body (18, 20, 22) to form a cavity through which flows a cooling fluid, wherein the cooling body (18, 20, 22) is of a multi-piece design and drainage openings (30) are positioned to transport away fluids in the form of condensation or moisture from an inner space (42) partially defined by the surface (34) and not in fluid communication with the cavity.

16. The method of claim 15 further comprising using as the cooling fluid a cooling fluid in a cooling circuit of the internal combustion engine.

17. A metering module comprising: a metering valve and a cooling body (18, 20, 22) enclosing a surface (34) and forming a cavity extending around at least a portion of the metering valve, wherein the cooling body (18, 20, 22) is of a multi-piece design and at least one drainage opening is configured to drain away condensation from an inner space (42) partially defined by the surface (34) and not in fluid communication with the cavity.

18. The metering module as claimed in claim 17, characterized in that the at least one drainage opening includes a plurality of drainage openings arranged on a circumference of the metering module (10) with a 120° spacing (58).

19. The metering module as claimed in claim 17, characterized in that the at least one drainage opening is formed as a channel-like recess.

20. The metering module of claim 17, wherein the cooling body comprises a first portion and a second portion rotatable relative to the first portion.

21. The metering module of claim 17, wherein the at least one drainage opening extends in an annularly formed collar.

22. The metering module as claimed in claim 21, characterized in that the annularly formed collar is located beneath a center shell (20) which is part of the cooling body.

* * * * *